(12) United States Patent
Shirane et al.

(10) Patent No.: US 7,020,373 B2
(45) Date of Patent: Mar. 28, 2006

(54) ANTIREFLECTIVE COATING STRUCTURE FOR PHOTONIC CRYSTAL AND METHOD FOR FORMING ANTIREFLECTIVE COATING STRUCTURE

(75) Inventors: Masayuki Shirane, Tokyo (JP); Jun Ushida, Tokyo (JP)

(73) Assignee: NEC Corporation, (JP)

( * ) Notice: Subject to any disclaimer, the term of this patent is extended or adjusted under 35 U.S.C. 154(b) by 300 days.

(21) Appl. No.: 10/402,232

(22) Filed: Mar. 26, 2003

(65) Prior Publication Data

US 2003/0231397 A1 Dec. 18, 2003

(30) Foreign Application Priority Data

Mar. 26, 2002 (JP) .............................. 2002-085591

(51) Int. Cl.
*G02B 6/10* (2006.01)

(52) U.S. Cl. ...................................... 385/130; 359/586

(58) Field of Classification Search .................. 385/11, 385/14, 15, 16, 24, 39, 48, 49, 115; 359/586
See application file for complete search history.

(56) References Cited

U.S. PATENT DOCUMENTS 4,991,937 A * 2/1991 Urino .......................... 359/494
6,188,819 B1 * 2/2001 Kosaka et al. ................. 385/39

FOREIGN PATENT DOCUMENTS

| JP | A 2000-121987 | 4/2000 |
| JP | A 11-271541 | 2/2001 |

OTHER PUBLICATIONS

English Translation of Abstract for Japanese Unexamined Patent Publication JP-A 11-271541 dated Feb. 13, 2001.
English Translation of Abstract for Japanese Unexamined Patent Publication JP-A 2000-121987 dated Apr. 28, 2000.
Preprint of 62$^{nd}$ annual meeting of Japan Society of Applied Physics, p. 1065, dated Sep. 11, 2001.
*An Introduction to Invariant Imbedding*, by R. Bellman and G.M. Wing, McGraw-Hill, New York, 1975.
*Electromagnetic Propagation in Periodic Stratified Media* by Pochi Yeh, et al., California Institute of Technology dated Nov. 1976.
*Immittance of Block Waves on Mirror Symmetry Plane of Photonic Crystals*, by Jun Ushida, et al., dated Apr. 2003.

* cited by examiner

*Primary Examiner*—Akm Enayet Ullah
(74) *Attorney, Agent, or Firm*—Ostrolenk, Faber, Gerb & Soffen, LLP

(57) ABSTRACT

A one-dimensional photonic crystal has a spatial distribution in which the refractive index periodically varies in a first direction that light is caused to be propagated and in which the refractive index is uniform in a second direction perpendicular to the first direction. An antireflective coating structure for the one-dimensional photonic crystal includes a thin-film having a refractive index and a thickness determined by a predetermined calculation method. A two or three-dimensional photonic crystal comprises two or more media that have different refractive indexes and are arranged in a two or three-dimensional pattern. An antireflective coating structure for the two or three-dimensional photonic crystal includes a thin-film comprising one of the media included in the photonic crystal. In the structure, the thin-film is disposed on an end face of the photonic crystal so as to increase the incident efficiency of light entering the photonic crystal. Thereby, the reflection of the photonic crystal is securely prevented in a simple manner.

8 Claims, 7 Drawing Sheets

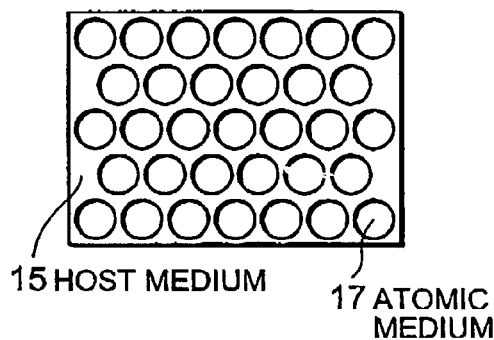
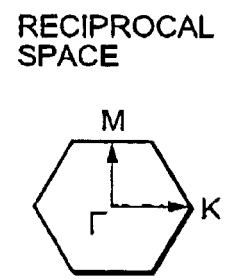
15 HOST MEDIUM  17 ATOMIC MEDIUM
FIG. 1A PRIOR ART   FIG. 1B PRIOR ART
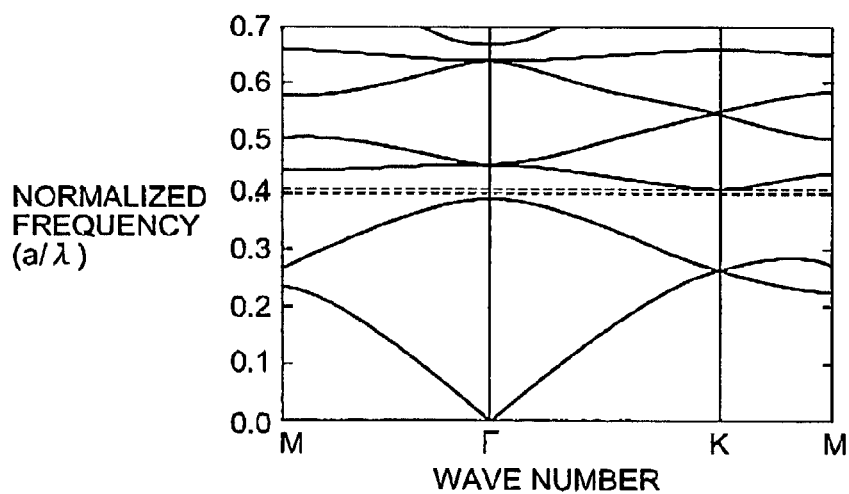
FIG. 2

ANTIREFLECTIVE COATING STRUCTURE FOR PHOTONIC CRYSTAL AND METHOD FOR FORMING ANTIREFLECTIVE COATING STRUCTURE

BACKGROUND OF THE INVENTION (1) Field of the Invention

The present invention relates to antireflective coating structures, and particularly relates to an antireflective coating structure for a photonic crystal and relates to a method for forming such an antireflective coating structure.

(2) Description of the Related Art

Recently, photonic crystals have been attracting much attention because they have specific optical dispersion characteristics and a function of confining light in a minute space having submicron dimensions.

A photonic crystal is defined as a structure in which two or more media having different refractive indexes are periodically arranged at intervals of a submicron length, which corresponds to a light wavelength, in a two or three-dimensional pattern. Another structure in which such media are arranged in a one-dimensional manner includes a dielectric multilayer film. A crystal having such a one-dimensional structure is herein included in the photonic crystal because of the following reasons: such a crystal has specific optical characteristics depending on the periodicity of arrangement and useful information applicable to the photonic crystal having such a two or three-dimensional structure can be obtained from the theoretical analysis of the one-dimensional structure crystal.

The photonic crystal includes a two-dimensional triangular lattice photonic crystal. This two-dimensional triangular lattice photonic crystal has a host medium and atomic media, having a cylindrical shape, disposed in the host medium in a two-dimensional triangular lattice pattern. The first Brillouin zone corresponding to the two-dimensional triangular lattice has a regular hexagonal shape. Each vertex of the hexagon corresponds to the K point, the midpoint of each side corresponds to the M point, and the center of the hexagon corresponds to the $\Gamma$ point. It is known that such a photonic crystal has an energy band (photonic band) with respect to a light wave propagated therein.

The energy band of the photonic crystal is obtained by calculation. In the energy band, there is an energy region in which light is not propagated and this energy region is called a photonic band gap (PBG). In the energy region except for PBG, light is propagated in the photonic crystal and there is a portion in which the wavelength dispersion is significant. An exemplary device using this wavelength dispersion characteristic includes a spectral-separation circuit disclosed in Japanese Unexamined Patent Publication (JP-A) No. 11-271541 (hereinafter referred to as a first related art), and a wavelength-dispersion compensator disclosed in Japanese Unexamined Patent Publication (JP-A) No. 2000-121987 (hereinafter referred to as a second related art).

In order to commercialize such devices disclosed in the first and second related arts, light must enter the photonic crystal for the devices with high efficiency through a medium, which is air in general, disposed on the photonic crystal. Therefore, the photonic crystal needs to have a non-reflective coating thereon.

In a structure in which two different homogeneous media having different refractive indexes are in contact with each other, an antireflective coating is used in general in order to reduce the refractive index of the interface to zero. This antireflective coating is called a $\lambda/4$ film in some cases because the thickness is equal to about one fourth of the wavelength $\lambda$ of the incident light.

However, the reflectivity of the photonic crystal cannot be simply defined in the same manner as that for homogeneous media and the region of the photonic crystal cannot also be defined clearly. Therefore, the above technique in which the antireflective coating is used for the homogeneous medium cannot be applied to the photonic crystal.

Instead of the photonic crystal having the antireflective coating, a photonic crystal structure having protrusions is disclosed in the preprint of the 62nd annual meeting of the Japan Society of Applied Physics, page 1065. This technique is hereinafter referred to as a third related art. This photonic crystal structure has a two-dimensional triangular lattice photonic crystal region in which cylindrical cavities are arranged in an Si host medium and protrusions disposed at the boundary between the photonic crystal region and the homogeneous Si region, wherein the protrusions are cavities having a shape of a combination of a triangular prism and a semicircular pillar. This photonic crystal is improved in transmissivity, by about 15 dB, at the boundary between the photonic crystal region and the Si portion, as compared with other photonic crystals having no protrusion.

In the third related art, the protrusions need to be cavities having a length of 1 μm or less and an angle of 10–20°, which is very small. When such protrusions are actually formed by a dry etching process, there is a risk that the sharp edge of each protrusion is rounded depending on the processing accuracy. Thus, it is difficult to precisely form the protrusions according to the design.

As described above, the above conventional techniques in which the antireflective coating is used for the homogeneous medium cannot be directly applied to the photonic crystal. Furthermore, it is difficult to make practical use of the above technique using the photonic crystal structure having the protrusions for preventing the reflection.

SUMMARY OF THE INVENTION

Accordingly, it is an object of the present invention to provide an antireflective coating structure for a photonic crystal in order to overcome the disadvantages of conventional antireflective coatings for photonic crystals, wherein the antireflective coating structure securely prevent reflection in a simple manner.

Furthermore, it is another object of the present invention to provide a method for forming an antireflective coating on the photonic crystal.

According to one aspect of the present invention, there is provided an antireflective coating structure for a one-dimensional photonic crystal having a spatial distribution in which the refractive index periodically varies in a first direction and in which the refractive index is uniform in a second direction perpendicular to the first direction. The antireflective coating structure includes a thin-film having a refractive index and a thickness determined by a predetermined calculation method. The thin-film is disposed on an end face of the one-dimensional photonic crystal so as to increase the incident efficiency of light.

According to another aspect of the present invention, there is provided an antireflective coating structure for a two or three-dimensional photonic crystal which comprises two or more media that have different refractive indexes and are arranged in a two or three-dimensional pattern. The antireflective coating structure includes a thin-film comprising at least one of the media which are included in the photonic crystal or not included therein. The thin-film is disposed on an end face of the photonic crystal so as to increase the incident efficiency of light entering the photonic crystal.

Another aspect of the present invention, there is provided a method of forming an antireflective coating on a one-dimensional photonic crystal having a spatial distribution in which the refractive index periodically varying in a first direction that light is caused to be propagated and in which the refractive index is uniform in a second direction perpendicular to the first direction. The method includes the step of providing a thin-film on an end face of the photonic crystal so as to increase the incident efficiency of light. The thin-film has a refractive index and a thickness determined by a predetermined method.

According to still another aspect of the present invention, there is provided a method of forming an antireflective coating on a two or three-dimensional photonic crystal which comprises two or more media that have different refractive indexes and are arranged in a two or three-dimensional pattern. The method includes the step of providing a thin-film comprising at least one of the media which are included in the photonic crystal on an end face of the photonic crystal or not included therein so as to increase the incident efficiency of light entering the photonic crystal.

BRIEF DESCRIPTION OF THE DRAWINGS

FIG. 1A is a top view showing a structure of a conventional two-dimensional photonic crystal;

FIG. 1B is a schematic view showing the first Brillouin zone for the conventional two-dimensional photonic crystal;

FIG. 2 is a graph showing the energy band of the structure shown in FIG. 1A;

DESCRIPTION OF THE PREFERRED EMBODIMENT

Before embodiments of the present invention is described, conventional antireflective coating structures for photonic crystals and a forming method thereof will now be described with reference to FIGS. 1 to 4 in order to promote a better understanding on the present invention.

As shown in FIG. 1A, a two-dimensional triangular lattice photonic crystal, which is an example of a conventional photonic crystal, has a host medium 15 and atomic media 17, having a cylindrical shape, arranged in the host medium 15 in a two-dimensional triangular lattice pattern.

As shown in FIG. 1B, the first Brillouin zone corresponding to the two-dimensional triangular lattice has a regular hexagonal shape. Each vertex of the hexagon corresponds to the K point, the midpoint of each side corresponds to the M point, and the center of the hexagon corresponds to the Γ point. The photonic crystal has an energy band (photonic band) with respect to a light wave propagated therein.

As shown in FIG. 2, the conditions of calculation are as follows: the host medium comprises Si, the atomic media comprise air, and d/a=0.867, wherein d represents the diameter of the cylindrical cavities and a represents the lattice constant. In this calculation, the direction of a vector representing the electric field of light is perpendicular to the plane of the figure. The vertical axis denotes the normalized frequency, which is defined as the formula Ω=a/λ, wherein λ represents the wavelength of light in vacuum. As shown in FIG. 2, light is not propagated in the region indicated by the dotted lines. This energy region is called a photonic band gap (PBG).

In the energy region except for PBG, light is propagated in the photonic crystal and there is a portion in which the wavelength dispersion is significant. A device using this wavelength dispersion characteristic includes a spectral separation circuit disclosed in the first related art and a wavelength-dispersion compensator disclosed in the second related art.

In order to commercialize such devices disclosed in the first and second related arts, light must enter a photonic crystal with high efficiency through a medium, which is air in general, disposed on the photonic crystal. Therefore, it is necessary to provide an antireflective coating on the photonic crystal.

Figure 3:
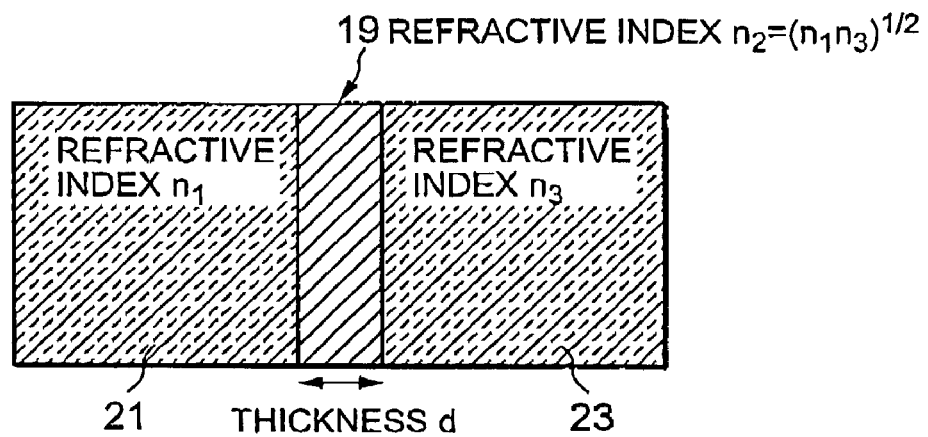
FIG. 3 is an illustration showing a conventional method for designing an antireflective coating for the interface between two homogeneous media having different refractive indexes.

FIG. 3 shows an antireflective coating 19 generally used in order to reduce the reflectivity of an interface to zero when two different homogeneous media having different refractive indexes are in contact with each other. Non-reflection can be theoretically achieved when the following conditions are satisfied:

$$n_2 = (n_1 \times n_3)^{1/2} \quad (1)$$

$$d = \lambda/4n_2 + m \times \lambda/2n_2 (m=0, 1, 2, \ldots) \quad (2)$$

wherein $n_1$ represents the refractive index of a homogeneous medium 21, $n_3$ represents the refractive index of a homogeneous medium 23, $n_2$ represents the refractive index of an antireflective coating 19, d represents the thickness, and λ represents the wavelength of light.

This antireflective coating is called a λ/4 film in some cases according to the above formula 2.

However, the reflectivity of the photonic crystal cannot be simply defined in the same manner as that for homogeneous media and the region of the photonic crystal cannot be defined clearly. Therefore, the above technique in which the antireflective coating is used for the above homogeneous media cannot be directly applied to the photonic crystal.

Instead of the photonic crystal having the antireflective coating, a photonic crystal structure having protrusions is disclosed in the preprint of the 62nd annual meeting of the Japan Society of Applied Physics, page 1065 (hereinafter referred to as a third related art).

Figure 4:
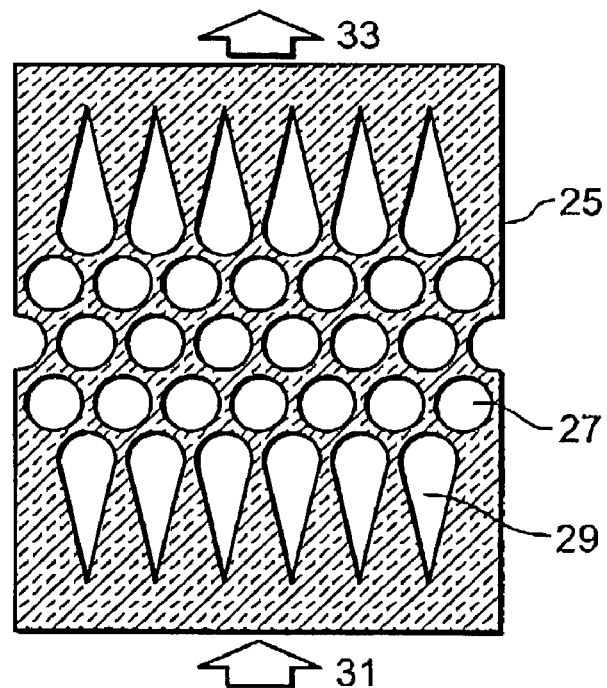
FIG. 4 is an illustration showing a conventional structure having an antireflective coating for a photonic crystal.

Referring to FIG. 4, the protrusion-provided photonic crystal includes a two-dimensional triangular lattice photonic crystal region in which cylindrical cavities 27 are disposed in a host medium 25 comprising Si and includes protrusions 29 disposed at the boundary between the photonic crystal region and the homogeneous Si portion, wherein the protrusions 29 are cavities having a shape of a combination of a triangular prism and a semicircular pillar. This photonic crystal is improved in transmissivity, by about 15 dB, at the boundary between the photonic crystal region and the Si portion, as compared with other photonic crystals having no protrusion.

Description will now be made as regards the Embodiments of the present invention with reference to FIGS. 5 to 13.

First of all, a new technique for forming an antireflective coating for a one-dimensional photonic crystal (periodic dielectric multilayer film) is described. The one-dimensional photonic crystal is defined as a photonic crystal having a spatial distribution in which the refractive index periodically varies in a first direction and in which the refractive index is uniform in a second direction perpendicular to the first direction. The antireflective coating on a surface of the one-dimensional photonic crystal is described below, wherein the surface is formed by cleaving the one-dimensional photonic crystal. A basic concept for forming the antireflective coating is based on a technique for forming a conventional non-reflective coating, which is called a $\lambda/4$ film. Since the refractive index periodically varies in the photonic crystal, it is a key to advantageously use the variation when the antireflective coating is designed.

As described in the above section Related Art, a technique for forming a non-reflective coating for homogeneous dielectrics has been established. The present invention provides the first technique for forming the antireflective coating for the one-dimensional photonic crystal (periodic dielectric multilayer film).

Figure 5:
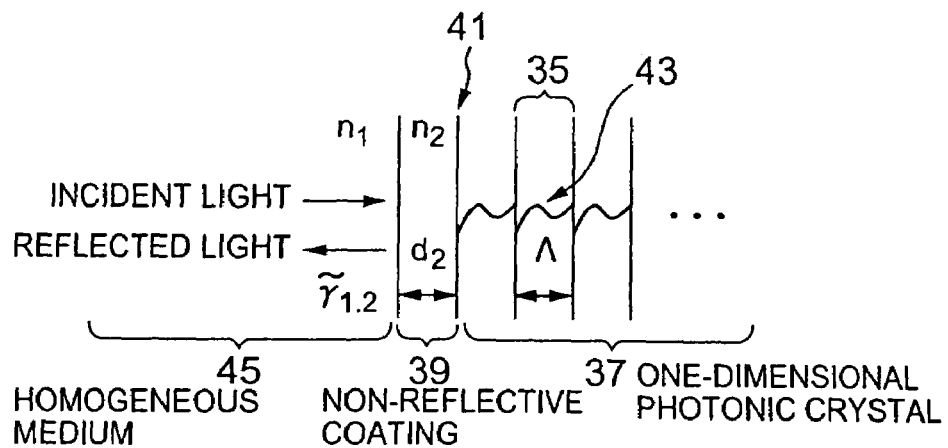
FIG. 5 is an illustration showing a structure of a single-layer antireflective coating of the present invention for a one-dimensional photonic crystal.

In the structure shown in FIG. 5, the one-dimensional photonic crystal 37 is in contact with an antireflective coating 39, which may be called a non-reflective coating, with an interface 41 therebetween, wherein the one-dimensional photonic crystal 37 has unit cells 35 periodically arranged in a one-dimensional pattern with a lattice constant $\Lambda$, and the antireflective coating 39 has a thickness of $d_2$. The unit cells 35 have a refractive index distribution 43 therein and an arbitrary spatial distribution in a one-dimensional direction. In FIG. 5, $n_1$ represents the refractive index of a homogeneous medium 45 through which light is propagated and $n_2$ represents the refractive index of the antireflective coating 39. All materials included in these portions are transparent. In such a case that light is incident on the one-dimensional photonic crystal through the homogeneous medium 45, as shown in FIG. 5, the reflectivity is determined according to the following three steps.

In the first step, functions representing the electromagnetic fields of the following regions are expanded with respect to a variable representing the natural mode in each region: the homogeneous medium 45, the antireflective coating 39, and the one-dimensional photonic crystal 37. In the second step, obtained terms are coupled according to Maxwell's boundary conditions. In the third step, linear simultaneous equations obtained according to the boundary conditions are solved. This procedure is the same as that in conventional macroscopic electromagnetics. Since the object of this procedure is the one-dimensional photonic crystal, it is a key to obtain the natural mode in the one-dimensional photonic crystal.

Each natural mode in the homogeneous medium 45 and the antireflective coating 39 is a plane wave. Since the one-dimensional photonic crystal 37 has periodic variation, the natural mode is the Bloch wave. The Bloch wave is represented by an eigenvector of a transfer matrix corresponding to one cycle.

In general, the transfer matrix M of a one-dimensional periodic structure comprising a transparent material is represented by the following formula (P. Yeh et al., J. Opt. Soc. Am. Vol. 67, 423 (1997)):

$$\begin{bmatrix} E(z-\Lambda) \\ H(z-\Lambda) \end{bmatrix} = \underbrace{\begin{bmatrix} a & ib \\ ic & d \end{bmatrix}}_{M} \begin{bmatrix} E(z) \\ H(z) \end{bmatrix} \tag{3}$$

In Formula 3, a, b, c, and d represent real functions determined depending on the structure of unit cells, and E and H each represent an electromagnetic field (a y element representing an electric field and an x element representing a magnetic field) parallel to the surface. According to the energy conservation, the determinant of the transfer matrix M is equal to one. The eigenvalue $\lambda_\pm$ and the eigenvector $v_\pm$, in which the normalization constant is removed, of the transfer matrix M are represented by the following formulas:

$$\lambda_\pm = [(a+d) \pm i\sqrt{4-(a+d)^2}]/2 \tag{4}$$

$$v_\pm = \begin{bmatrix} E_k \\ H_k \end{bmatrix} = \begin{bmatrix} i(d-\lambda_\pm/c) \\ 1 \end{bmatrix} \tag{5}$$

In the above formulas, k represents the Bloch number, which is an index for determining a natural mode in the electromagnetic field. Formula 5 represents the natural mode of the one-dimensional photonic crystal 37 having periodic arrangement. When linear simultaneous equations made according to the Maxwell boundary conditions are solved, the following formulas representing the amplitude reflectivity of the crystal on which light is incident from the homogeneous media 45 are obtained:

$$\tilde{r}_{1,2} = \frac{r_{1,2} + r_{2,3}\exp[2ik_2 d_2]}{1 + r_{1,2}r_{2,3}\exp[2ik_2 d_2]} \tag{6}$$

$$r_{i,i+1} = \frac{n_i - n_{i+1}}{n_i + n_{i+1}}, (i=1,2) \tag{7}$$

Formulas 6 and 7 are formally similar to those representing the amplitude reflectivity of a structure in which a first homogeneous media having a refractive index $n_2$ is disposed between a second homogeneous media having a refractive index $n_1$ and a third homogeneous media having a refractive index $n_3$. In this description, since the one-dimensional photonic crystal is used, the refractive index $n_3$, which is a material constant, is not a real number. This is the definite difference therebetween. The definition of $n_3$ in Formula 7 is represented by the following formula using a value of the Bloch wave (Formula 5) at the interface 41, wherein the Bloch wave is the natural mode of light in the one-dimensional photonic crystal 37 having the periodic arrangement;

$$n_3 = -H_k/E_k \quad (8)$$

The one-dimensional photonic crystal with the periodic structure has a complicated effect on the reflectivity and such an effect is expressed by Formula 8. That is, Formula 8 represents one of the core techniques of the present invention.

In general, since $n_3$ in Formula 8 is a complex number, such a thickness $d_2$ and such a refractive index $n_2$ that the amplitude reflectivity (Formula 6) is equal to zero cannot be obtained. However, the reflectivity of a photonic crystal having a single-layer antireflective coating can be minimized and is represented by the following formula:

$$R_1 = |\tilde{r}_{1,2}|^2 \quad (9)$$

When the antireflective coating is designed, the thickness $d_2$ and the refractive index $n_2$ satisfying the following conditions are determined: the first-order partial differential coefficient of the reflectivity $R_1$ with respect to the thickness $d_2$ and the refractive index $n_2$ is equal to zero and the second-order partial differential coefficient is positive. According to the above method, it is possible to determine the optimum thickness $d_2$ and refractive index $n_2$ of the antireflective coating 39 for the one-dimensional photonic crystal having a single-layer antireflective coating. When the value of the function represented by Formula 8 is a real number, that is, when the phase of the electric field agrees with that of the magnetic field, the reflectivity can be reduced to zero with a non-reflective coating. When the interface between the one-dimensional photonic crystal and the antireflective coating is the mirror plane of symmetry of an infinite one-dimensional photonic crystal, the value of the function represented by Formula 5 always is a real number. Thus, an interface having a reflectivity of zero can be designed using the non-reflective coating. It is important to design such an interface. In a general case when the mirror plane of symmetry cannot be obtained, the reflectivity can be minimized by the above method and can be reduced to zero using the following multilayer antireflective coating.

The above method for designing the single-layer antireflective coating for the photonic crystal and the principle can be applied to the formation of a multilayer antireflective coating for the one-dimensional photonic crystal. When light enters the one-dimensional photonic crystal at a certain incident angle and in an arbitrary polarization mode (a TM polarization (p polarization) mode or a TE polarization (s polarization) mode), the method and principle can be also applied.

Figure 6:
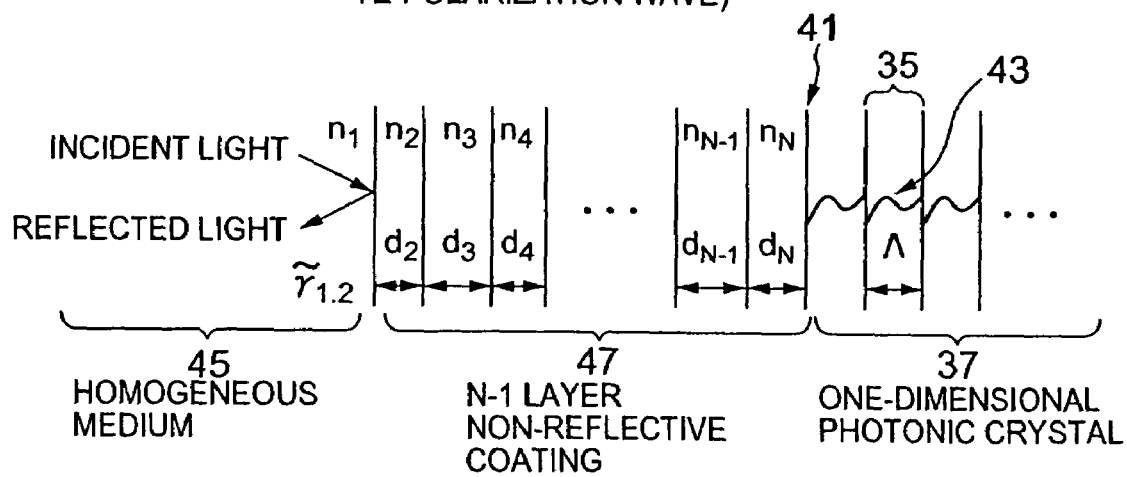
FIG. 6 is an illustration showing a structure of an N–1 layer antireflective coating of the present invention for the one-dimensional photonic crystal.

With reference to FIG. 6, the following one-dimensional photonic crystal having an N–1 layer antireflective coating thereon will now be described: the one-dimensional photonic crystal on which light is incident at an certain incident angle and in an arbitrary polarization mode. There are the following differences between the multilayer antireflective coating shown in FIG. 6 and the single-layer antireflective coating shown in FIG. 5: (a) the structure, which is a multilayer type or a single-layer type; (b) the incident angle, which is arbitrary or predetermined; and (c) the light polarization, which is the TM polarization or the TE polarization. Except for these three differences, the configuration shown in FIG. 6 is the same as that shown in FIG. 5. Both configurations have the same definition of the interface 41 between the one-dimensional photonic crystal and the antireflective coating, the same definition of the unit cells 35 of the one-dimensional photonic crystal, and the same refractive index 43 having an arbitrary spatial distribution in the unit cells 35.

According to Formula 7 representing the amplitude reflectivity $r_{2,3}$ and Formula 8, the amplitude reflectivity of the one-dimensional photonic crystal 37 on which light is incident through the homogeneous medium can be determined. Thus, the reflectivity $R_{N-1}$ of the one-dimensional photonic crystal having an antireflective coating with N–1 layers can be represented by the following formulas:

$$R_{N-1} = |\tilde{r}_{1,2}|^2 \quad (10)$$

$$\tilde{r}_{i,i+1} = \frac{r_{i,i+1} + \tilde{r}_{i+1,i+2}\exp[2ik_{i+1}d_{i+1}]}{1 + r_{i,i+1}\tilde{r}_{i+1,i+2}\exp[2ik_{i+1}d_{i+1}]}, (i=1,2,3,\ldots,N) \quad (11)$$

$$r_{i,i+1}^{(TE)} = \frac{k_i - k_{i+1}}{k_i + k_{i+1}}, \quad (12)$$

$$r_{i,i+1}^{(TM)} = \frac{n_{i+1}^2 k_i - n_i^2 k_{i+1}}{n_{i+1}^2 k_i + n_i^2 k_{i+1}}, (i=1,2,3,\ldots,N-1),$$

$$r_{N,N+1} = \alpha \frac{\beta + 1/n_{N+1}}{\beta - 1/n_{N+1}}$$

$$n_{N+1} = -H_k/E_k \quad (13)$$

Formula 11 is described in R. Bellman and G. M. Wing, An Introduction to Invariant Imbedding, New York, McGraw-Hill, 1975. It is necessary to pay attention when recursive calculation is performed. In the formula, $k_i$ represents the wave number of incident light perpendicular to the ith interface, $d_i$ represents the thickness of the ith antireflective coating, and $n_i$ represents the refractive index of each region, when i=1, 2, . . . , N. The TM polarization is obtained when $\alpha = -1$ and $\beta = ck_N/\omega n_N^2$, and the TE polarization is obtained when $\alpha = 1$ and $\beta = -\omega/ck_N$. In Formula 13, $E_k$ and $H_k$ represent the electric component and the magnetic component, respectively, which are parallel to the surface, in each of the TM polarization and the TE polarization. Formula 11 is formally the same as the formula representing the reflectivity of the homogeneous multilayer dielectric film in the same manner as that for the formula (Formula 6) represents the reflectivity of the one-dimensional photonic crystal having the antireflective coating. However, the refractive index, which is a material constant, represented by Formula 13 corresponding to Formula 8 is not a real number, which is the definite difference therebetween. The one-dimensional photonic crystal has a complicated effect on the reflection of light and such an effect is expressed by Formula 13. That is, Formula 13 also represents one of the core techniques of the present invention.

The thickness $d_i$ and the refractive index $n_i$ are determined using Formulas 10 to 13 when the first-order partial differential coefficient of the reflectivity $R_{N-1}$ with respect to the thickness $d_i$ and the refractive index $n_i$ is equal to zero and the second-order partial differential coefficient is positive, wherein i=2, 3, . . . , N. Thus, the reflectivity of the one-dimensional photonic crystal having the N–1 layer antireflective coating can be minimized using the obtained values.

The above method for determining the thickness and refractive index of the N–1 layer antireflective coating and the principle can be generally used not depending on the incident angle of light, the direction of polarization, and the number of layers in the antireflective coating. In the same manner as that for the single-layer antireflective coating, the above method and principle can be used for the one-dimensional photonic crystal having any multilayer antireflective coating because the above method and principle do not depend on the number and the kind of materials contained in a unit cell and the shape and thickness of the unit Next, in order to describe a first example of the present invention, a crystal having a single-layer antireflective coating and periodical arrangement is described. The periodical arrangement has unit cells including two layers having the same thickness. One of the two layers comprises $SiO_2$ and has a refractive index of 1.5, and the other comprises amorphous Si and has a refractive index of 3.5.

Figure 7:
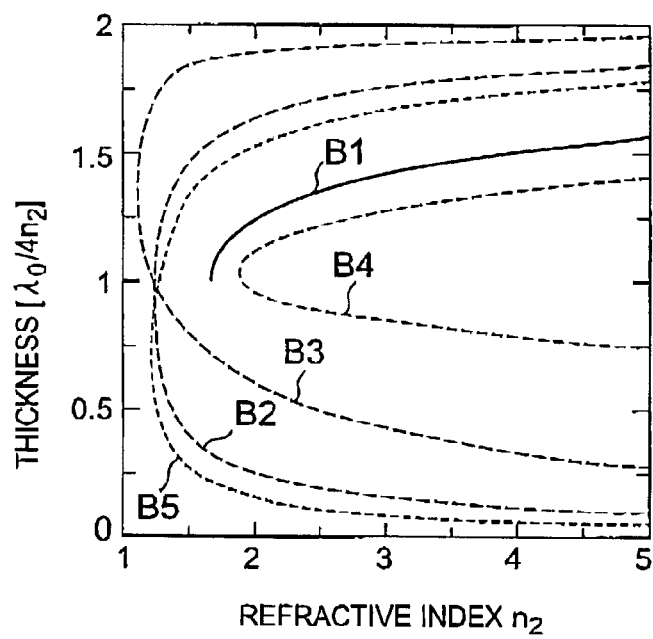
FIG. 7 is a graph showing the optimum thickness and refractive index of an antireflective coating of the present invention for the one-dimensional photonic crystal using a map.

FIG. 7 shows the relationship between the thickness $d_2$ and refractive index $n_2$ of the antireflective coating, wherein the thickness $d_2$ and the refractive index $n_2$ are determined by the above method so as to minimize the reflectivity. In FIG. 7, the thickness represented by the vertical axis is normalized with the factor $\lambda_0/4n_2$, wherein $\lambda_0$ represents the wavelength of light in vacuum. In FIG. 7, B1 to B5 represent the first to fifth bands, respectively, in increasing order of energy. Since the optimum thickness $d_2$ and refractive index $n_2$ depend on the bands of the photonic crystal and the wavelength of light, B1 to B5 each show a curve.

Figure 8A:
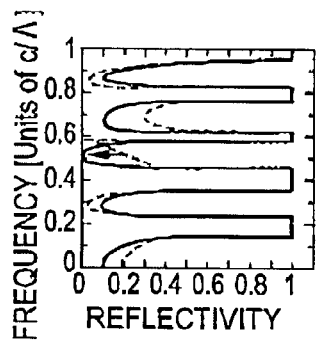
FIGS. 8A to 8C include graphs each showing the reflectivity of an optimum antireflective coating of the present invention for the one-dimensional photonic crystal.
Figure 8B:
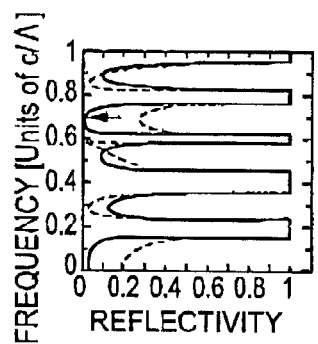
Figure 8C:
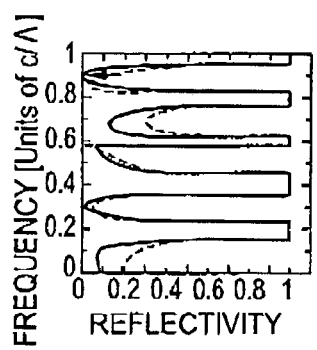

FIG. 8 shows the reflectivity obtained by calculation using the optimum thickness $d_2$ and refractive index $n_2$ determined according to FIG. 7. In FIG. 8, the solid line indicates the reflectivity of the crystal having the antireflective coating thereon and the dotted line indicates the reflectivity of the crystal having no antireflective coating. FIGS. 8A, 8B, and 8C show the reflectivity that is the minimum when the normalized frequency ($\Omega=\Lambda/\lambda$) is 0.5, 0.7, and 0.9, respectively, which are each indicated by the arrow.

As shown in FIG. 8, the reflectivity (solid line) of the crystal having the antireflective coating is substantially equal to zero, that is, the reflectivity of the crystal having the antireflective coating is smaller than the reflectivity (dotted line) of the crystal having no antireflective coating, at a light frequency indicated by the arrow.

FIG. 9 shows the dependency of the reflectivity on the thickness $d_2$ and refractive index $n_2$ of the antireflective coating using contour lines in order to illustrate that the thickness $d_2$ and the refractive index $n_2$ used for calculation for making FIG. 8 provide the minimum reflectivity. The ten contour lines are arranged at regular intervals between the maximum and the minimum. Color gradation is used as follows: each area for indicating the maximum reflectivity is colored black and each area for indicating the minimum reflectivity is colored white. Each point indicated by the symbol x represents the optimum design values used for the calculation of the reflectivity in FIG. 8. It is clear that the reflectivity has the minimum at the design values.

In the above paragraphs, the first embodiment is described using the technique for forming the antireflective coating on the one-dimensional photonic crystal. In this description, the unit cells of the crystal includes the $SiO_2$ and amorphous Si layers having the same thickness and the crystal has the single-layer antireflective coating thereon. However, the method for designing the antireflective coating and the principle do not depend on the kind of materials included in the unit cells; the number, shape, and thickness of the unit cells; the number of antireflective coatings; the incident angle of light; and the direction of polarization. Therefore, it is possible to design the optimum antireflective coating (the reflectivity having the minimum or being equal to zero) for one-dimensional photonic crystals comprising any transparent material using this method and principle.

In the single-layer antireflective coating, only one of the refractive index and the thickness may be optimized. Such a single-layer antireflective coating is within the scope of the present invention. In the N−1 layer antireflective coating, one of the refractive index and the thickness of the N−1 layers may be optimized. Such a multilayer antireflective coating is also within the scope of the present invention. That is, even if all of the N−1 layers are not optimized in refractive index and thickness, the multilayer antireflective coating is within the scope of the present invention.

Next, an antireflective coating structure for two or three-dimensional photonic crystals will now be described. When the reflectivity of a two or three-dimensional photonic crystal is obtained, the amount of calculation is huge as compared with that for the one-dimensional photonic crystal. Therefore, it is very difficult to precisely determine the reflectivity. In the one-dimensional photonic crystal, the reflectivity sharply increases as the energy band becomes close to PBG. This means that the refractive index $n_3$ sharply increases. On the other hand, the group refractive index is a parameter that sharply increases as the energy band becomes close to PBG. The group refractive index is defined as the ratio of the velocity of light in vacuum to the energy-propagation velocity of light in the crystal and can be determined according to the energy band structure using the following formula:

$$d\omega/dk=c/n_g \qquad (14)$$

Thus, in the design of the antireflective coating, it is probable that the use of the group refractive index $n_g$ provides a good result if the refractive index $n_g$ obtained by precise calculation is not used.

A second embodiment of the present invention will now be described. The second embodiment provides a method for forming the antireflective coating for the two or three-dimensional photonic crystal.

In the one-dimensional photonic crystal, the refractive index $n_g$ can be precisely determined by calculation. However, in the two or three-dimensional photonic crystal having complicated configuration, this technique cannot be used. A first approximate value of the refractive index $n_g$ is determined using the group refractive index $n_g$, which can be readily obtained using a photonic band graph. In the calculation of the photonic band graph, a general calculation method such as a plane-wave expansion method or a finite-difference time-domain (FDTD) method can be used. The group refractive index $n_g$ can be obtained by deriving Formula 14 using the photonic band graph. When the obtained group refractive index $n_g$ is substituted into Formulas 1 and 2, the refractive index $n_g$ and the thickness d of the antireflective coating can be obtained.

Figure 9A:
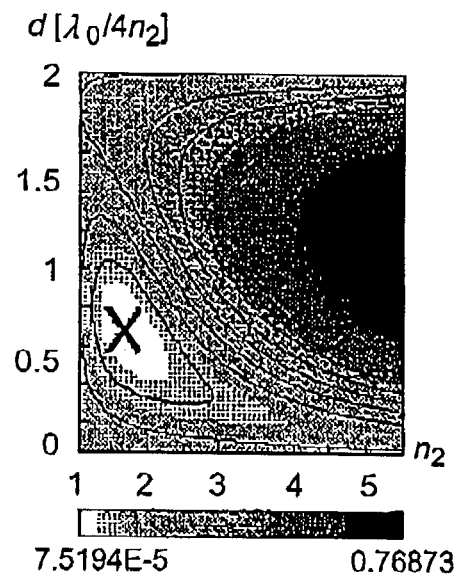
FIGS. 9A to 9C are graphs showing the dependency of the reflectivity of the one-dimensional photonic crystal on the refractive index and the thickness.
Figure 9B:
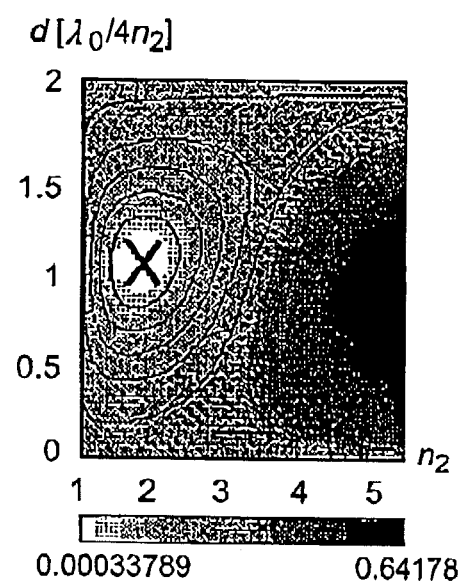
Figure 9C:
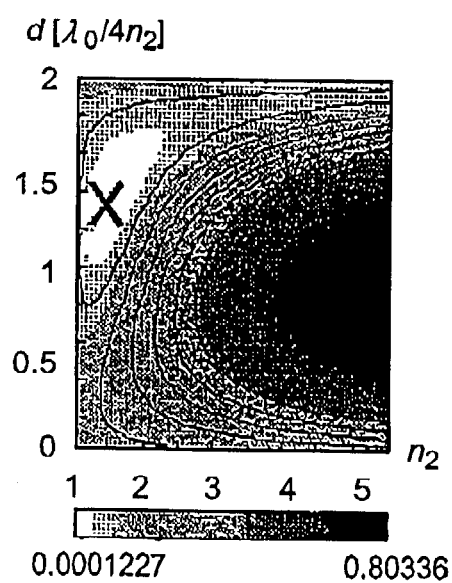

Since these values are determined using the group refractive index $n_g$, which is the first approximate value of the refractive index $n_3$, there is a risk that such values slightly deviate from the optimum values and therefore the correction is required in some cases. A particular procedure of the correction is described below. FIGS. 9A to 9C show the dependency of the reflectivity of the one-dimensional photonic crystal on the refractive index and the thickness. As shown in FIGS. 9A to 9C, the thickness has such a value that the reflectivity has the minimum when the refractive index is set to a certain value. In the two or three-dimensional photonic crystal, the procedure is the same as above. Thus, the optimum value of the thickness d can be determined by calculation such that the transmissivity has the maximum, that is, the reflectivity has the minimum. In the calculation, the thickness d is caused to vary near the approximate value obtained according to the above procedure while the refractive index $n_2$ is fixed to the approximate value obtained above, and a calculation method such as the FDTD method is used.

The refractive index is a material constant and therefore there is a risk that a medium having the refraction index $n_2$ does not exist or such a medium cannot be obtained. In such a case, the effect of preventing reflection can be obtained to a certain extent when such an antireflective coating that includes a medium having a refractive index near the refractive index $n_2$ is used. In this case, the optimum value d of the thickness can be determined by calculation such that the transmissivity has the maximum. In the calculation, the FDTD method or the like is used while the thickness is treated as a variable and the initial value is one fourth of the wavelength $\lambda$.

Figure 10:
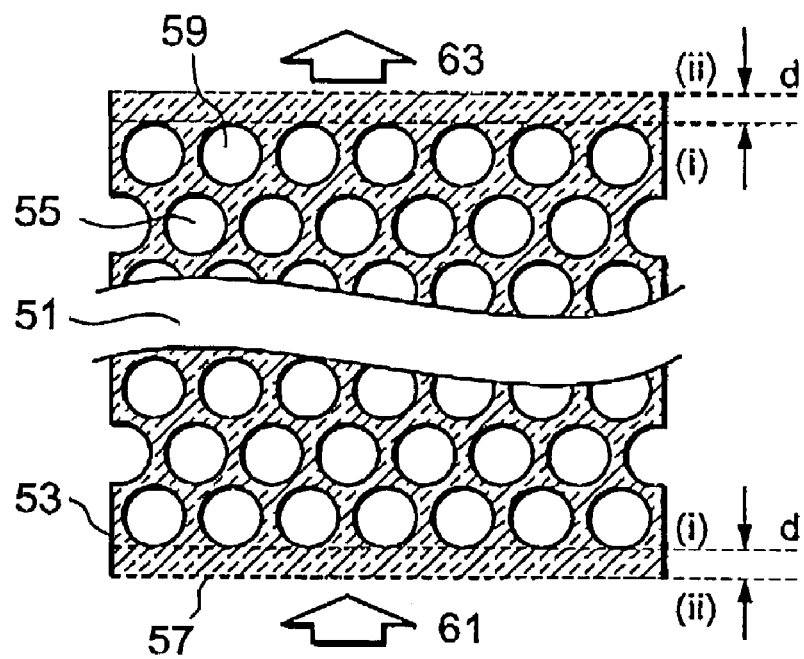
FIG. 10 is an illustration showing a second embodiment of a photonic crystal having an antireflective coating structure of the present invention.

A second example according to the present invention will now be described with reference to FIG. 10, based on the above principle. The second example provides an antireflective coating for a two or three-dimensional photonic crystal. As shown in FIG. 10, the photonic crystal 51 has a two-dimensional triangular lattice structure and includes a host medium 53 comprising Si and an atomic media 55 containing air. The host medium 53 has a refractive index of 3.5, the atomic media 55 have a refractive index of 1.0, the triangular lattice structure has a lattice constant a of 0.75 μm, and the atomic media 55 includes cylindrical cavities with a diameter d of 0.65 μm. The ratio a/d is 0.867. FIG. 2 shows the energy bands of this photonic crystal. The photonic crystal has a light-entering face 57 and a light-exiting face 59. Each boundary between the photonic crystal and air is defined as a surface in contact with the cylindrical cavities, which are innumerable. In FIG. 10, i indicates the boundary. In this case, the photonic crystal is surrounded by air.

Spectrum-separating devices use relatively high frequencies, that is, relatively high energy. A band in which the normalized frequency $\Omega$ is 0.456 to 0.496 and light is propagated is described below. Since $\Omega=a/d$, this band corresponds to a wavelength of 1.512 to 1.645 μm when a=0.75 μm.

Figure 11:
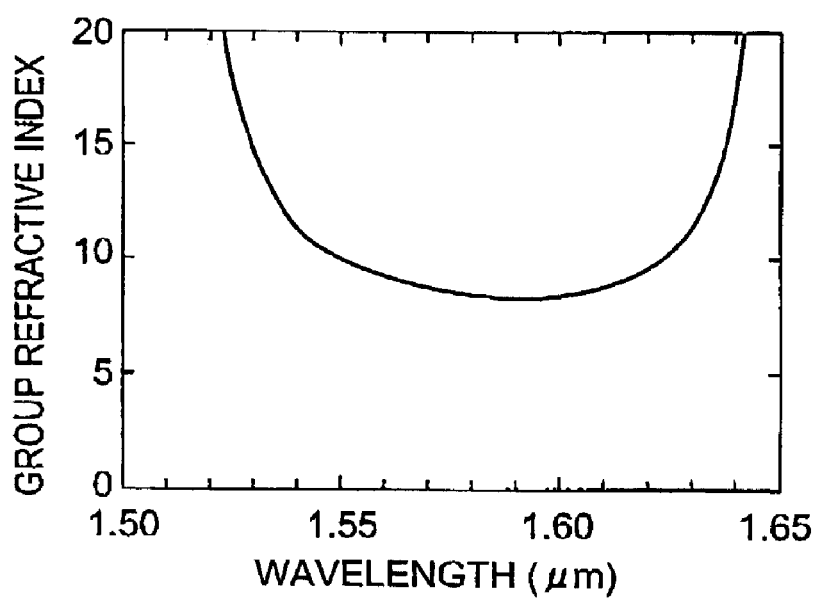
FIG. 11 is a graph showing the group refractive index of the photonic crystal in the second embodiment of the present invention.

As shown in FIG. 11, it is clear that the group refractive index in a photonic crystal of the present invention can be determined according to the photonic band graph shown in FIG. 2 using Formula 14. The group refractive index ranges from about 10 to several tens and sharply increases toward 100 near both ends of the band. In this case, that is, there is no non-reflective coating, it is probable that strong reflection arises at the interface because the difference between the refractive index of the photonic crystal and that of air is large, wherein the refractive index of air is one.

Figure 12:
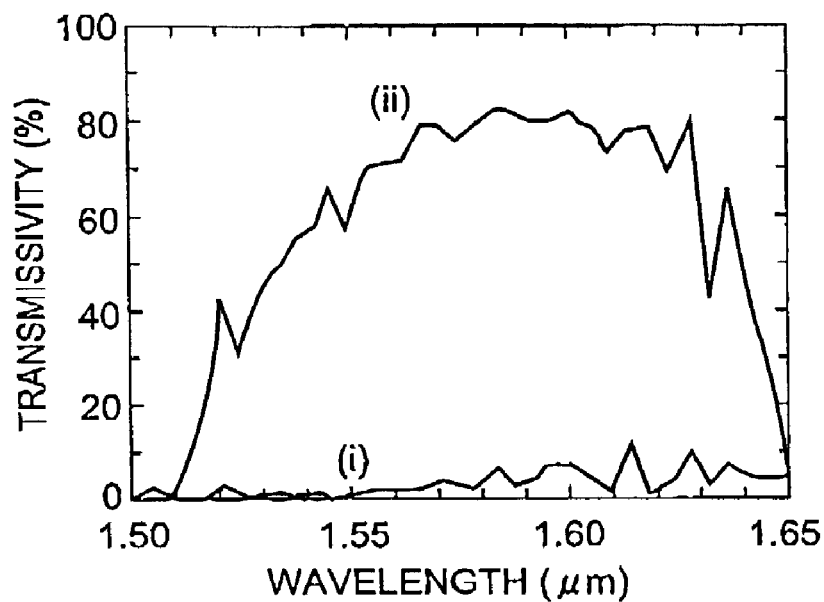
FIG. 12 is a graph showing transmissivity spectra obtained at light-entering and exiting faces of the photonic crystal, wherein the light-entering and exiting faces are indicated by i and ii in FIG. 10.

As shown in FIG. 12, i indicates the transmissivity spectrum of light, wherein the transmissivity is determined by calculation when the light-entering and exiting faces each function as the interface between the photonic crystal and air, that is, there is no antireflective coating. In the calculation, the FDTD method is used. Short pulse light is applied onto the light-entering face to monitor the time waveform of transmitted light at the light-exiting face. The Fourier transform of the time waveform is performed to obtain the transmissivity spectrum. According to the calculation result, it is clear that the transmissivity is several percent in the measurement range of the wavelength. Since a finite region 20-μm square is used for the measurement and multiple reflection arises between the light-entering and exiting faces, there are peaks and valleys in the spectrum.

Since light cannot enter the photonic crystal having the above configuration, it is necessary to form an antireflective coating structure. Since a medium in contact with the photonic crystal has a refractive index of 1, the refractive index $n_2$ of the antireflective coating is determined using Formula 1 as follows: $n_2=(10*1)^{1/2}=3.2$ when $\lambda=1.55$ μm and $n_g=10$, wherein $\lambda$ represents the wavelength of light of which the reflection is prevented and $n_g$ represents the group refractive index determined according to FIG. 12. Since the obtained refractive index is an approximate value, a configuration in which the host medium comprising Si functions as the antireflective coating is described below, wherein the host medium has a refractive index of 3.5. In this configuration, the thickness of the $\lambda/4$ film is 0.11 μm. The thickness is then determined by calculation using the FDTD method so as to obtain the maximum transmissivity while the thickness is caused to vary near the above value. In this case, the optimum thickness is 0.10 μm.

As shown in FIG. 12, ii indicates the transmissivity when the optimum thickness d is 0.10 μm. If this technique is used, a transmissivity of 80% or more can be achieved in a predetermined wavelength range. The transmissivity indicated by ii is ten times or more as large as that indicated by i.

As described above, when the thickness of the Si layer in the photonic crystal is set to have a predetermined value, a transmissivity of 80% or more can be achieved. In this technique, the photonic crystal does not need to have protrusions near the corresponding light-entering and exiting faces but needs to simply have only flat surfaces. Such a photonic crystal can be readily achieved as compared with conventional crystals.

Figure 13:
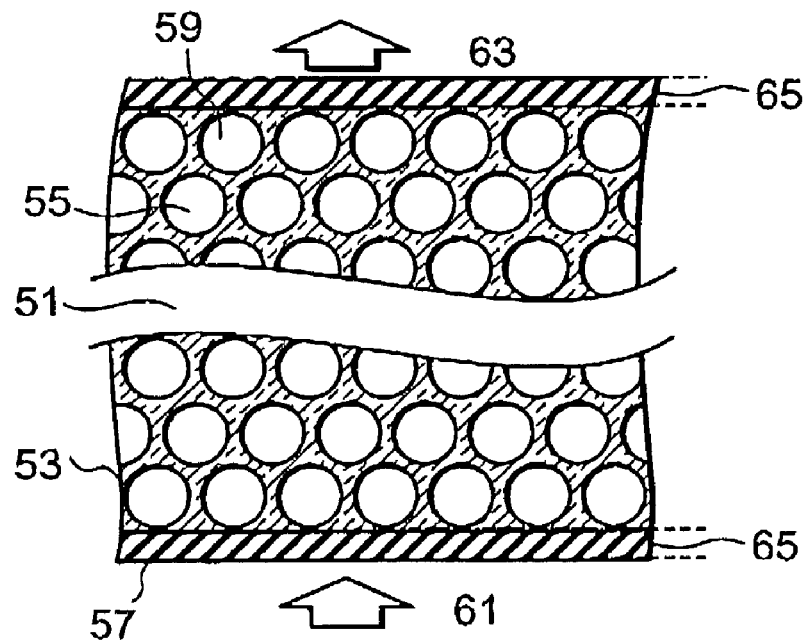
FIG. 13 is an illustration showing a third embodiment of a photonic crystal having an antireflective coating structure of the present invention.

A third example of the present invention will now be described with reference to FIG. 13. The third example provides an antireflective coating structure for a photonic crystal. In the second example, the host medium of the photonic crystal functions as the antireflective coating. In this case, since the refractive index of the antireflective coating is the same as that of the host medium, there are limitations when an optimum antireflective coating is designed. Therefore, in the third embodiment, another antireflective coating comprising a material different from that of the host material is used in order to eliminate such limitations, thereby obtaining optimum conditions of the antireflective coating. As shown in FIG. 13, the photonic crystal has end faces processed in advance and amorphous Si thin-films 65 disposed on the corresponding end faces. The amorphous Si thin-films 65 are formed by a vapor deposition method and have an appropriate refractive index. A material for deposition may be different from that of the host medium of the photonic crystal. In this case, the antireflective coating needs to have a refractive index that is equal to the intermediate between the group refractive index of the photonic crystal and that of a medium in contact with the antireflective coating. Furthermore, the refractive index of the antireflective coating is preferably near the refractive index $n_2$ obtained using Formula 1. The approximate value of the thickness with respect to the wavelength determined according to Formula 2 is used as an initial value and calculation is then performed using the FDTD method and the above refractive index, thereby obtaining the optimum thickness.

According to the above technique, in the second embodiment, if the thickness of the antireflective coating deviates from a design value, the deviation can be compensated for by adjusting the thickness of another coating formed on the antireflective coating. In the two or three-dimensional photonic crystal, when the antireflective coating has a multilayer film in which two or more layers of media having different refractive indexes are arranged, the antireflective coating can be used in the same manner as that for the one-dimensional photonic crystal. In this case, when the thickness and so on are designed, Formulas 10 to 13 used for the one-dimensional photonic crystal may be used. The multilayer film may include a photonic crystal structure in which media having different refractive indexes are periodically arranged.

In this embodiment, the photonic crystal comprises Si and contains air. Other materials including compound semiconductors, such as GaAs, and insulating materials, such as, $SiO_2$ may be used, wherein these materials are transparent in an operating wavelength range. Furthermore, the following crystals may be used: two dimensional photonic crystals having a tetragonal lattice structure or a hexagonal lattice structure other than the triangular lattice structure used in this embodiment, and three-dimensional photonic crystals having the diamond structure.

The antireflective coating has a thickness equal to $\lambda/4$ in this embodiment. However, the thickness may be equal to $3\lambda/4$, $5\lambda/4$, and so on, according to Formula 2.

In this embodiment, the photonic crystal having the following structure is used, the two-dimensional triangular lattice structure having a sufficient length in the direction perpendicular to the plane of FIG. 10. However, such a slab photonic crystal that has a thickness substantially equal to the lattice constant and is sandwiched between medium, such as air having low refractive index may be used. In this case, the thickness of the Si layer for preventing reflection can be determined according to the following procedure: the band structure of the slab photonic crystal is determined, the group refractive index is obtained, and the FDTD calculation is performed according to the above-mentioned procedure.

As described above, the present invention provides a antireflective coating structure for a photonic crystal and a method for forming the structure, wherein the structure has antireflective coatings that are each disposed on the light-entering and exiting faces of the photonic crystal and have a predetermined thickness, thereby improving the light-entering and exiting efficiency of the photonic crystal in a simple and effective manner.

What is claimed is:

1. An antireflective coating structure for a one-dimensional photonic crystal having a spatial distribution in which the refractive index periodically varies in a first direction that light is caused to be propagated and in which the refractive index is uniform in a second direction perpendicular to the first direction, the antireflective coating structure comprising a thin-film having a refractive index and a thickness determined by a predetermined calculation method, the thin-film being disposed on an end face of the one-dimensional photonic crystal so as to increase the incident efficiency of light.

2. The antireflective coating structure according to claim 1, wherein the thin-film comprises at least one layer of one or more medium.

3. The antireflective coating structure according to claim 1, wherein the thin-film comprises at least one layer of one or more medium, the interface between the antireflective coating structure and the one-dimensional photonic crystal corresponding to the mirror plane of symmetry of an infinite photonic crystal.

4. An antireflective coating structure for a two or three-dimensional photonic crystal comprising two or more media that have different refractive indexes from each other and are arranged in a two or three-dimensional pattern, the antireflective coating structure comprising a thin-film disposed on an end face of the photonic crystal so as to increase the incident efficiency of light entering the photonic crystal, the refractive indexes having values based on a group refractive index, which is a first approximate value of the refractive index of the antireflective coating structure.

5. The antireflective coating structure according to claim 4, wherein the thin-film comprises one selected from the media included the in the photonic crystals.

6. The antireflective coating structure according to claim 4, wherein the thin-film disposed on the end face of the photonic crystal so as to increase the incident efficiency of light has a thickness determined by a predetermined method.

7. The antireflective coating structure according to claim 4, wherein the thin film thin-film disposed on an end face of the photonic crystal so as to increase the incident efficiency of light comprises at least one medium different from the media included in the photonic crystal, the thin-film having a refractive index and a thickness determined by a predetermined method.

8. The antireflective coating structure according to claim 6, wherein the thin-film includes a multilayer film, the multilayer film comprising two or more media that are different from the media included in the photonic crystal and have different refractive indexes from each other.

* * * * *